United States Patent
Abercrombie et al.

(10) Patent No.: US 12,299,046 B2
(45) Date of Patent: May 13, 2025

(54) PAGINATED LISTING WITH PARTIAL PAGES

(71) Applicant: Dell Products, L.P., Round Rock, TX (US)

(72) Inventors: John Abercrombie, Seattle, WA (US); Brandon Tarquinio, Seattle, WA (US); Micah Priddis, Silverdale, WA (US)

(73) Assignee: DELL PRODUCTS L.P., Round Rock, TX (US)

( * ) Notice: Subject to any disclaimer, the term of this patent is extended or adjusted under 35 U.S.C. 154(b) by 63 days.

(21) Appl. No.: 18/193,614

(22) Filed: Mar. 30, 2023

(65) Prior Publication Data
US 2024/0330374 A1    Oct. 3, 2024

(51) Int. Cl.
*G06F 16/00* (2019.01)
*G06F 16/9038* (2019.01)
*G06F 16/906* (2019.01)

(52) U.S. Cl.
CPC ........ *G06F 16/9038* (2019.01); *G06F 16/906* (2019.01)

(58) Field of Classification Search
None
See application file for complete search history.

(56) References Cited

U.S. PATENT DOCUMENTS 10,235,417 B1 * 3/2019 Sterin ................. G06F 16/1805
2021/0319008 A1 * 10/2021 Dharmalingam ........ G06N 3/02

* cited by examiner

*Primary Examiner* — Anhtai V Tran
(74) *Attorney, Agent, or Firm* — Amin, Turocy & Watson, LLP

(57) ABSTRACT

A system can receive a first request to list elements of a storage system that satisfy a search criterion. The system can determine to respond to the first request with a first page of results. The system can perform an iteration of identifying a group of results of the elements that satisfy the search criterion, wherein a number of results in the group of results is less than the limit, and wherein there is at least one result that is not included in the group of results. The system can, in response to determining that a threshold amount of time has elapsed relative to a timeout event associated with the first request, return the first page of results, wherein the first page of results comprises the group of results, and a token that is usable to identify the first request in a second request for a second page of results.

20 Claims, 11 Drawing Sheets

400

(402)

↓

RECEIVING A FIRST REQUEST TO LIST ELEMENTS OF A STORAGE SYSTEM THAT SATISFY A SEARCH CRITERION 404

↓

DETERMINING TO RESPOND TO THE FIRST REQUEST WITH A FIRST PAGE OF RESULTS, WHEREIN THERE IS A LIMIT TO A NUMBER OF RESULTS CONTAINED IN THE FIRST PAGE 406

↓

PERFORMING AN ITERATION OF IDENTIFYING A GROUP OF RESULTS OF THE ELEMENTS THAT SATISFY THE SEARCH CRITERION, WHEREIN A NUMBER OF RESULTS IN THE GROUP OF RESULTS IS LESS THAN THE LIMIT, AND WHEREIN THERE IS AT LEAST ONE RESULT THAT IS NOT INCLUDED IN THE GROUP OF RESULTS 408

↓

IN RESPONSE TO DETERMINING THAT A THRESHOLD AMOUNT OF TIME HAS ELAPSED RELATIVE TO A TIMEOUT EVENT ASSOCIATED WITH THE FIRST REQUEST, RETURNING THE FIRST PAGE OF RESULTS, WHEREIN THE FIRST PAGE OF RESULTS COMPRISES THE GROUP OF RESULTS, AND A TOKEN THAT IS USABLE TO IDENTIFY THE FIRST REQUEST IN A SECOND REQUEST FOR A SECOND PAGE OF RESULTS THAT SATISFY THE SEARCH CRITERION 410

502

IN RESPONSE TO RECEIVING THE SECOND REQUEST, PERFORMING A SECOND ITERATION OF IDENTIFYING A SECOND GROUP OF RESULTS OF THE ELEMENTS THAT SATISFY THE SEARCH CRITERION, WHEREIN THE SECOND GROUP OF RESULTS IS DIFFERENT THAN THE FIRST GROUP OF RESULTS 504

IN RESPONSE TO DETERMINING THAT A SECOND NUMBER OF RESULTS IN THE SECOND GROUP OF RESULTS IS EQUAL TO THE LIMIT, RETURNING THE SECOND PAGE AND THE TOKEN, WHEREIN THE SECOND PAGE COMPRISES THE SECOND GROUP OF RESULTS 506

IN RESPONSE TO RECEIVING THE SECOND REQUEST, PERFORMING A SECOND ITERATION OF IDENTIFYING A SECOND GROUP OF RESULTS OF THE ELEMENTS THAT SATISFY THE SEARCH CRITERION, WHEREIN THE SECOND GROUP OF RESULTS IS DIFFERENT THAN THE FIRST GROUP OF RESULTS 604

IN RESPONSE TO DETERMINING THAT A SECOND NUMBER OF RESULTS IN THE SECOND GROUP OF RESULTS IS LESS THAN THE LIMIT AND THAT THERE ARE NO MORE RESULTS, RETURNING THE SECOND PAGE WITHOUT RETURNING THE TOKEN, WHEREIN THE SECOND PAGE COMPRISES THE SECOND GROUP OF RESULTS 606

DETERMINING TO RESPOND TO A FIRST REQUEST TO LIST ELEMENTS IN DATA STORAGE THAT SATISFY A SEARCH CRITERION WITH A PAGINATED RESULT, WHEREIN THE PAGINATED RESULT COMPRISES AN UPPER LIMIT ON NUMBER OF RESULTS 804

↓

PERFORMING AN ITERATION OF IDENTIFYING A GROUP OF RESULTS OF THE ELEMENTS THAT SATISFY THE SEARCH CRITERION, WHEREIN A NUMBER OF RESULTS IN THE GROUP OF RESULTS IS LESS THAN THE UPPER LIMIT ON THE NUMBER OF RESULTS, AND WHEREIN THE GROUP OF RESULTS DOES NOT COMPRISE AT LEAST ONE ADDITIONAL RESULT 806

↓

IN RESPONSE TO DETERMINING THAT A THRESHOLD AMOUNT OF TIME HAS ELAPSED RELATIVE TO A TIMEOUT EVENT ASSOCIATED WITH THE FIRST REQUEST, RETURNING THE PAGINATED RESULT THAT COMPRISES THE GROUP OF RESULTS, AND A TOKEN THAT IS CONFIGURED TO BE USED TO IDENTIFY THE FIRST REQUEST IN A SECOND REQUEST FOR A SECOND PAGINATED RESULT 808

DETERMINING TO RESPOND TO A FIRST REQUEST TO LIST ELEMENTS THAT SATISFY A SEARCH CRITERION WITH A PAGINATED RESULT 1004

↓

PERFORMING AN ITERATION OF IDENTIFYING A GROUP OF RESULTS OF THE ELEMENTS THAT SATISFY THE SEARCH CRITERION, WHEREIN A NUMBER OF RESULTS IN THE GROUP OF RESULTS IS LESS THAN A MAXIMUM NUMBER OF RESULTS, AND WHEREIN THERE IS AT LEAST ONE ADDITIONAL RESULT THAT IS OUTSIDE OF THE GROUP OF RESULTS 1006

↓

IN RESPONSE TO DETERMINING THAT A THRESHOLD AMOUNT OF TIME HAS ELAPSED RELATIVE TO A TIMEOUT EVENT ASSOCIATED WITH THE FIRST REQUEST, RETURNING THE PAGINATED RESULT THAT COMPRISES THE GROUP OF RESULTS, AND A TOKEN THAT IS CONFIGURED TO IDENTIFY THE FIRST REQUEST IN A SECOND REQUEST FOR A SECOND PAGINATED RESULT 1008

PAGINATED LISTING WITH PARTIAL PAGES

BACKGROUND

A data storage system can perform operations to respond to requests to list elements of the data storage system that meet certain search criteria.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive a first request to list elements of a storage system that satisfy a search criterion. The system can determine to respond to the first request with a first page of results, wherein there is a limit to a number of results contained in the first page. The system can perform an iteration of identifying a group of results of the elements that satisfy the search criterion, wherein a number of results in the group of results is less than the limit, and wherein there is at least one result that is not included in the group of results. The system can, in response to determining that a threshold amount of time has elapsed relative to a timeout event associated with the first request, return the first page of results, wherein the first page of results comprises the group of results, and a token that is usable to identify the first request in a second request for a second page of results that satisfy the search criterion.

An example method can comprise determining, by a system comprising a processor, to respond to a first request to list elements in data storage that satisfy a search criterion with a paginated result, wherein the paginated result comprises an upper limit on number of results. The method can further comprise performing, by the system, an iteration of identifying a group of results of the elements that satisfy the search criterion, wherein a number of results in the group of results is less than the upper limit on the number of results, and wherein the group of results does not comprise at least one additional result. The method can further comprise, in response to determining that a threshold amount of time has elapsed relative to a timeout event associated with the first request, returning, by the system, the paginated result that comprises the group of results, and a token that is configured to be used to identify the first request in a second request for a second paginated result.

An example non-transitory computer-readable medium can comprise instructions that, in response to execution, cause a system comprising a processor to perform operations. These operations can comprise determining to respond to a first request to list elements that satisfy a search criterion with a paginated result. These operations can further comprise performing an iteration of identifying a group of results of the elements that satisfy the search criterion, wherein a number of results in the group of results is less than a maximum number of results, and wherein there is at least one additional result that is outside of the group of results. These operations can further comprise, in response to determining that a threshold amount of time has elapsed relative to a timeout event associated with the first request, returning the paginated result that comprises the group of results, and a token that is configured to identify the first request in a second request for a second paginated result.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 4 illustrates another example process flow that can facilitate paginated listing with partial pages, in accordance with an embodiment of this disclosure;

FIG. 5 illustrates another example process flow that can facilitate paginated listing with partial pages, in accordance with an embodiment of this disclosure;

FIG. 6 illustrates another example process flow that can facilitate paginated listing with partial pages, in accordance with an embodiment of this disclosure;

FIG. 8 illustrates another example process flow that can facilitate paginated listing with partial pages, in accordance with an embodiment of this disclosure;

FIG. 10 illustrates another example process flow that can facilitate paginated listing with partial pages, in accordance with an embodiment of this disclosure;

DETAILED DESCRIPTION

Overview

Figure 1:
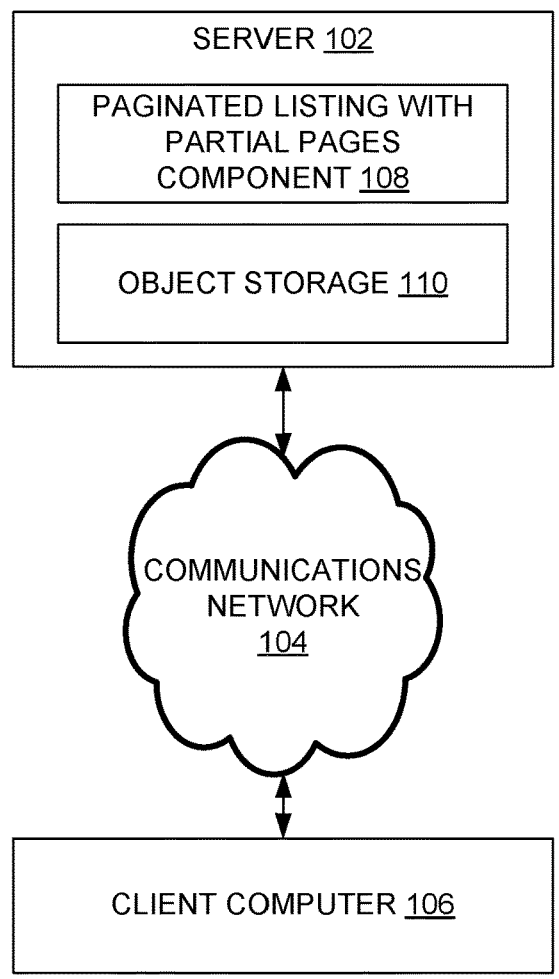
FIG. 1 illustrates an example system architecture that can facilitate paginated listing with partial pages, in accordance with an embodiment of this disclosure.

When listing objects from a system using pagination, it can be that each request returns a fixed size "page" of results with a token to continue the list in a subsequent request. The system can build a page by collecting elements from its index, and filtering those that do not match the search criteria. When the index is sufficiently large and there are few items in the index that match the search criteria, the request can timeout before a full page of results is collected.

The present techniques can be implemented to facilitate the system in returning an incomplete page of results with a token where the system determines that it will not be able to collect a full page before the timeout occurs. The token can again be used to continue the list at a point in the index where the system left off, rather than at the end of the incomplete page. Permissions to allow partial pages can be granted to the system via a flag in the request, or in a global system parameter.

Listing with pagination can comprise a process by which a user can acquire a complete list of elements making up a collection one "page" at a time. In a cloud object storage system, examples of listable element can include objects, object versions, files, uploads, buckets, and users. At scale, such lists can be too large to generate and send over the wire in time and space appropriate for a single request and response between an object client and server. Instead, it can be that a single list request can receive a response from the server containing one page of elements and a token. The page can contain the number of elements described by the page size. The page size can be prescribed by a parameter in the request, with a default (e.g., 1,000) if not provided. The token can be provided as a parameter in a subsequent request to continue the list from where the page ended. When a response is received with a non-truncated page and no token, the complete list can be acquired by combining all received pages.

A combination of all pages received in response to a series of paginated list requests, beginning with a request that provides no token, and ending with a non-truncated page in response, can comprise an entirety of a listed collection.

To build a single page of results, a storage system (e.g., an object storage system) can execute an internal listing loop of the following steps: internally list a dynamically sized page of objects from its index, gather needed metadata for each listed object, filter those objects that do not match the search criteria, and populate the result with those remaining. The loop can be executed until a complete page of results is accumulated.

Examples of search criteria can include live/readable objects, visible objects (those that are not artificially hidden by a delete marker), objects that belong to a specific bucket, and objects that start with some prefix.

When an index is sufficiently large and there are few items in the index that match the search criteria, it can be that the request timeouts before a full page of results is collected.

Prior approaches for list requests can return a timeout or hypertext transfer protocol (HTTP) 500 (internal server error) or 503 (service unavailable) response to the user if the requested operation cannot be achieved within a timeout window. Listing with partial pages allowed can greatly reduce a likelihood of timeout errors, increasing the reliability of the list operation.

One prior approach to reduce the likelihood of a timeout can be to reduce the requested page size if an application programming interface (API) supports it. A problem with this approach can be that it is difficult for a user to predict an optimal page size such that the number of requests required to complete the list is minimal. Moreover, an optimal page size can be variable depending on the search criteria and natural variations in the index. In contrast, when listing with partial pages is allowed, it can be that any partial page in the responses is the optimal page size for that request. That is, according to the present techniques, a need for the user to determine the correct page size can be removed.

Another approach to reduce the likelihood of a timeout is to adjust the underlying indexes or add a secondary index on the system to make certain criteria more searchable. Changing a structure of an index can often be infeasible at a geo-distributed scale due to time and resource costs. Space requirements can increase linearly with each secondary index. In contrast, when listing with partial pages allowed, reliability of list operations can be achieved without a costly operation to modify the index or additional space requirements.

Example Architecture

FIG. 1 illustrates an example system architecture 100 that can facilitate paginated listing with partial pages, in accordance with an embodiment of this disclosure.

System architecture 100 comprises server 102, communications network 104, and client computer 106. In turn, server 102 comprises paginated listing with partial pages component 108, and object storage 110.

Figure 11:
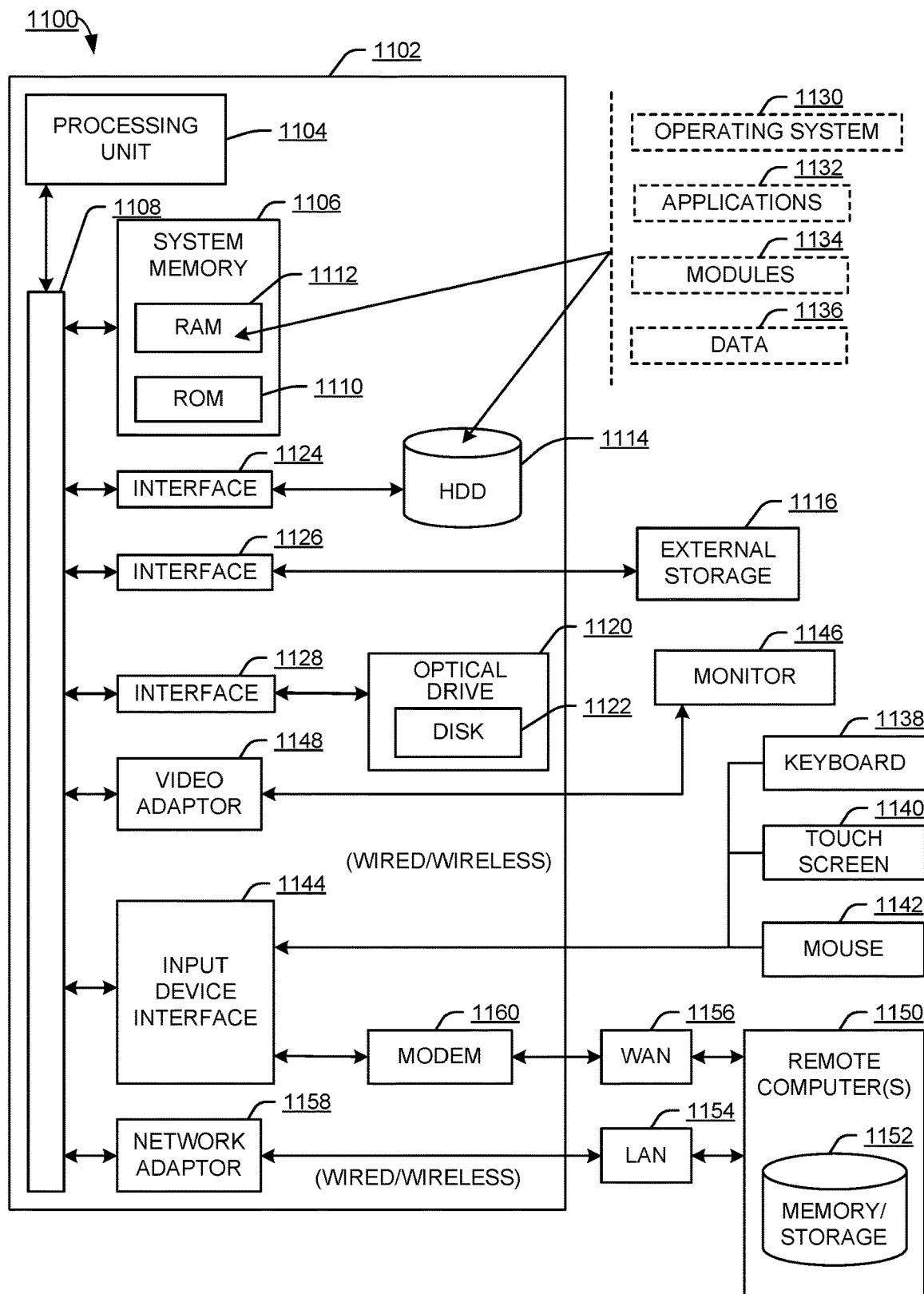
FIG. 11 illustrates an example block diagram of a computer operable to execute an embodiment of this disclosure.

Each of server 102 and/or client computer 106 can be implemented with part(s) of computing environment 1100 of FIG. 11. Communications network 104 can comprise a computer communications network, such as the Internet.

Server 102 can store computer data in object storage 110. Object storage can generally comprise storing data as objects in a flat namespace. While the examples herein generally relate to object storage, it can be appreciated that the present techniques can be applied to other types of computer storage, such as file system storage, where data is stored as files in a hierarchical structure of directories.

Client computer 106 can send a request to server 102, via communications network 104, to list objects in object storage 110 that meet one or more criteria. Server 102 can implement pagination, where a partial list of results is returned as a "page," and multiple pages can be returned that collectively form the entire listing of objects that meet the one or more criteria.

Paginated listing with partial pages component 108 can facilitate returning paginated results, such as by ensuring that a timeout event is not experienced while identifying the relevant objects.

In some examples, paginated listing with partial pages component 108 can implement part(s) of the process flows of FIGS. 2-10 to implement paginated listing with partial pages.

It can be appreciated that system architecture 100 is one example system architecture for paginated listing with partial pages, and that there can be other system architectures that facilitate paginated listing with partial pages.

Example Process Flows

Figure 2:
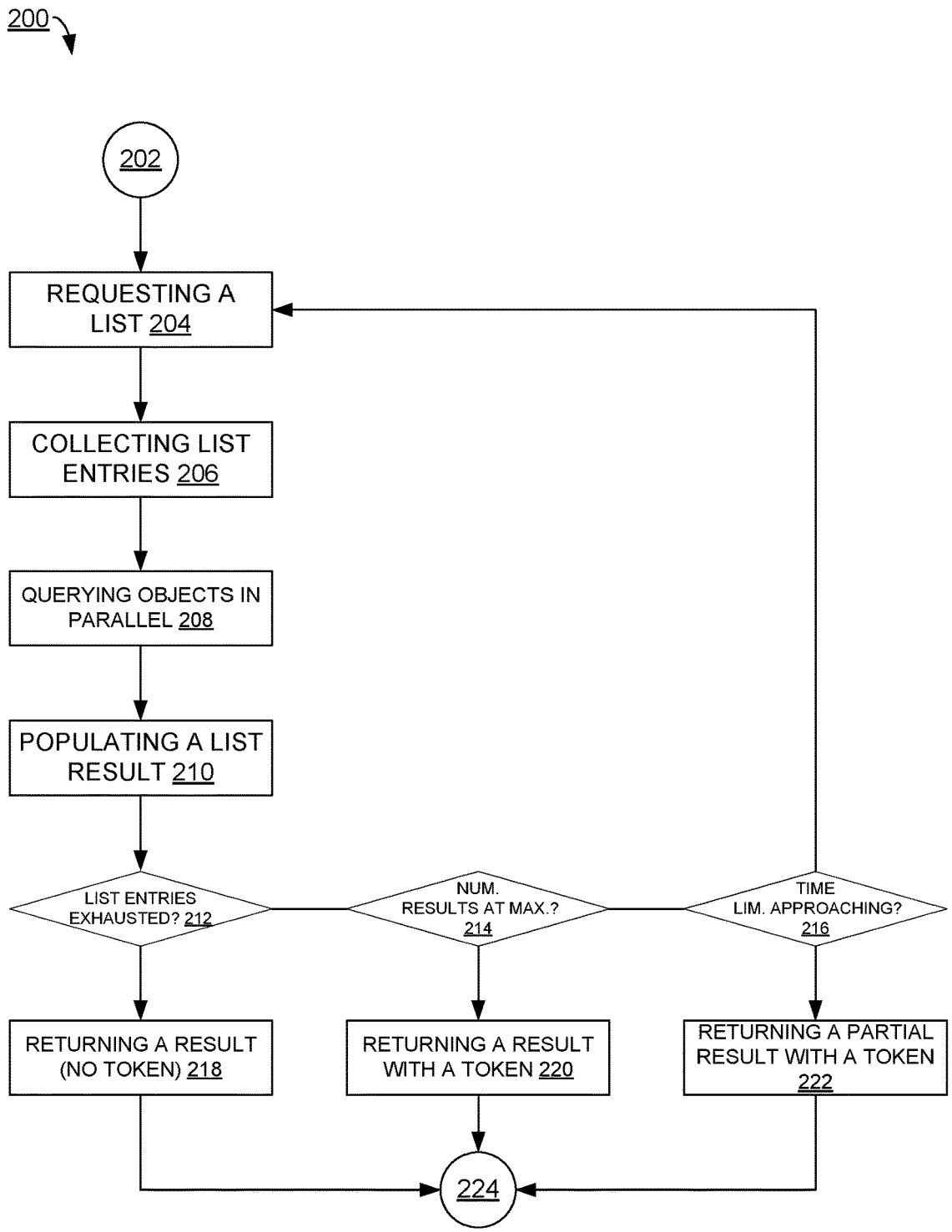
FIG. 2 illustrates an example process flow that can facilitate paginated listing with partial pages, in accordance with an embodiment of this disclosure.

FIG. 2 illustrates an example process flow 200 that can facilitate paginated listing with partial pages, in accordance with an embodiment of this disclosure. In some examples, one or more embodiments of process flow 200 can be implemented by paginated listing with partial pages component 108 of FIG. 1, or computing environment 1100 of FIG. 11.

It can be appreciated that the operating procedures of process flow 200 are example operating procedures, and that there can be embodiments that implement more or fewer operating procedures than are depicted, or that implement the depicted operating procedures in a different order than as depicted. In some examples, process flow 200 can be implemented in conjunction with one or more embodiments of one or more of process flow 300 of FIG. 3, process flow 400 of FIG. 4, process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Process flow 200 begins with 202, and moves to operation 204.

Operation 204 is reached from 202, and operation 216 where it is determined that a time limit is not approaching. Operation 204 depicts requesting a list.

After operation 204, process flow 200 moves to operation 206.

Operation 206 depicts collecting list entries.

After operation 206, process flow 200 moves to operation 208.

Operation 208 depicts querying objects in parallel.

After operation 208, process flow 200 moves to operation 210.

Operation 210 depicts populating a list result.

After operation 210, process flow 200 moves to operation 212.

Operation 212 depicts determining whether list entries are exhausted.

Where it is determined in operation 212 that list entries are exhausted, process flow 200 moves to operation 218. Instead, where it is determined in operation 212 that list entries are not exhausted, process flow 200 moves to operation 214.

Operation 214 is reached from operation 212 where it is determined that list entries are not exhausted. Operation 214 depicts determining whether a number of results is at a maximum.

Where it is determined in operation 214 that a number of results is at a maximum, process flow 200 moves to operation 220. Instead, where it is determined in operation 214 that a number of results is not at a maximum, process flow 200 moves to operation 216.

Operation 216 is reached from operation 214 where it is determined that a number of results is not at a maximum. Operation 216 depicts determining whether a time limit is approaching.

Where it is determined in operation 216 that a time limit is approaching, process flow 200 moves to operation 222. Instead, where it is determined in operation 216 that a time limit is not approaching, process flow 200 moves to operation 222.

Operation 218 is reached from operation 212 where it is determined that list entries are exhausted. Operation 218 depicts returning a result.

After operation 218, process flow 200 moves to 224, where process flow 200 ends.

Operation 220 is reached from operation 214 where it is determined that a number of results is at a maximum. Operation 220 depicts returning a result with a token.

After operation 220, process flow 200 moves to 224, where process flow 200 ends.

Operation 222 is reached from operation 216 where it is determined that a time limit is approaching. Operation 222 depicts returning a partial result with a token.

After operation 222, process flow 200 moves to 224, where process flow 200 ends.

In process flow 200, the system can return an incomplete page of results if it determines that it cannot safely complete another iteration of the loop before the timeout. An incomplete or partial page, like a complete page of results, can indicate to the user that the list can be continued (and is truncated), and provide a token with which to continue. A difference between a partial page and a complete page can be that a partial page may contain any number of elements N such that 0<=N<=requested page size. A listing can be satisfied by combining all pages, partial or complete.

A calculation made by the system to determine its likelihood of achieving another iteration before the timeout can be performed in a variety of ways. Its implementation can comprise comparing the time remaining against a set threshold or a machine learning technique. One example can comprise tracking a mean time taken for each iteration, and abort returning a partial page if mean(iteration_duration) *c<time_remaining. In some examples, c can be 1.5 by default, and can be configurable via global parameter.

It can be that the system does not have the ability to return partial pages by default. Partial pages can be allowed by explicitly setting a global variable or by setting the request flag to true (?allow-partial-results=true). The present techniques can be implemented to return a partial page and a token in response to a list request based on a timeout avoidance strategy while maintaining Listing Invariant A. Prior approaches to paginated listing do not support partial pages in list response with the expressed intent to prevent timeouts.

Figure 3:
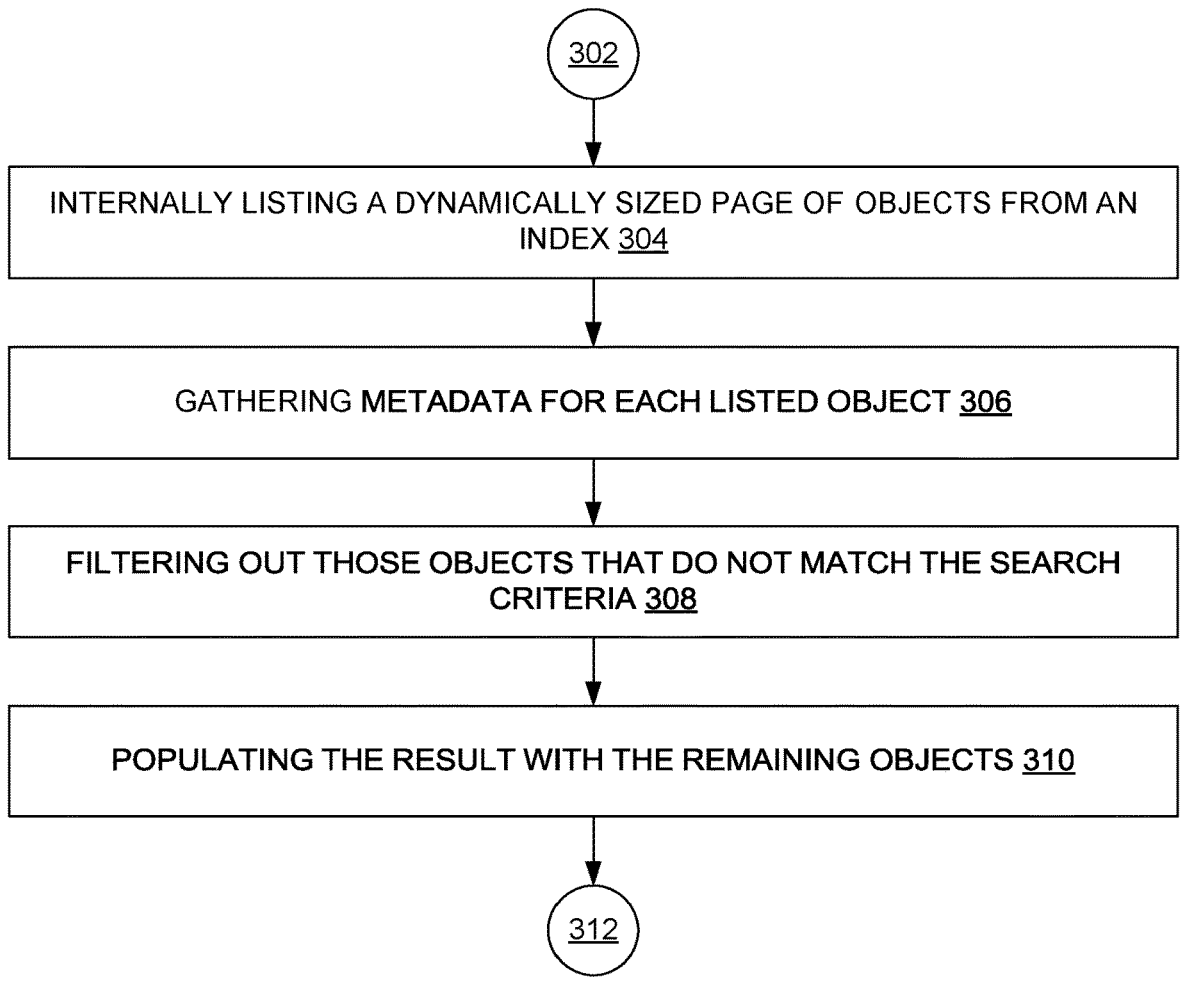
FIG. 3 illustrates another example process flow that can facilitate paginated listing with partial pages, in accordance with an embodiment of this disclosure.

FIG. 3 illustrates an example process flow 300 that can facilitate paginated listing with partial pages, in accordance with an embodiment of this disclosure. In some examples, one or more embodiments of process flow 300 can be implemented by paginated listing with partial pages component 108 of FIG. 1, or computing environment 1100 of FIG. 11.

It can be appreciated that the operating procedures of process flow 300 are example operating procedures, and that there can be embodiments that implement more or fewer operating procedures than are depicted, or that implement the depicted operating procedures in a different order than as depicted. In some examples, process flow 300 can be implemented in conjunction with one or more embodiments of one or more of process flow 200 of FIG. 2, process flow 400 of FIG. 4, process flow 500 of FIG. 5, process flow 600 of FIG. 6, process flow 700 of FIG. 7, process flow 800 of FIG. 8, process flow 900 of FIG. 9, and/or process flow 1000 of FIG. 10.

In some examples, process flow 300 represents operating procedures performed by paginated listing with partial pages component 108 of FIG. 1, in conjunction with partial pages component 108, to perform paginated listing with partial pages.

Process flow 300 begins with 302, and moves to operation 304.

Operation 304 depicts internally listing a dynamically sized page of objects from an index.

After operation 304, process flow 300 moves to operation 306.

Operation 306 depicts gathering metadata for each listed object.

After operation 306, process flow 300 moves to operation 308.

Operation 308 depicts filtering out those objects that do not match the search criteria.

After operation 308, process flow 300 moves to operation 310.

Operation 310 depicts populating the result with the remaining objects.

After operation 310, process flow 300 moves to 312, where process flow 300 ends.

FIG. 4 illustrates an example process flow 400 that can facilitate paginated listing with partial pages, in accordance with an embodiment of this disclosure. In some examples, one or more embodiments of process flow 400 can be implemented by paginated listing with partial pages component 108 of FIG. 1, or computing environment 1100 of FIG. 11.

It can be appreciated that the operating procedures of process flow 400 are example operating procedures, and that there can be embodiments that implement more or fewer operating procedures than are depicted, or that implement the depicted operating procedures in a different order than as depicted. In some examples, process flow 400 can be implemented in conjunction with one or more embodiments of one or more of process flow 200 of FIG. 2, process flow 300 of FIG. 3, process flow 500 of FIG. 5, process flow 600 of FIG. 6, process flow 700 of FIG. 7, process flow 800 of FIG. 8, process flow 900 of FIG. 9, and/or process flow 1000 of FIG. 10.

Process flow 400 begins with 402, and moves to operation 404.

Operation 404 depicts receiving a first request to list elements of a storage system that satisfy a search criterion. Using the example of system architecture 100 of FIG. 1, this can comprise client computer 106 sending the first request to server 102. The elements to be listed can be elements of object storage 110, and the search criterion can be a filter.

After operation 404, process flow 400 moves to operation 406.

Operation 406 depicts determining to respond to the first request with a first page of results, wherein there is a limit to a number of results contained in the first page. That is, the results returned by server 102 of FIG. 1 to client computer 106 can be paginated, where a page can contain a maximum number of results.

After operation 406, process flow 400 moves to operation 408.

Operation 408 depicts performing an iteration of identifying a group of results of the elements that satisfy the search criterion, wherein a number of results in the group of results is less than the limit, and wherein there is at least one result that is not included in the group of results. That is, at least on iteration of finding results in object storage 110 of FIG. 1 can be performed, where a number of results found is less than a maximum number of results in a page of results to be returned to client computer 106. Additionally, it can be that not all results have yet been found in object storage 110.

In some examples, performing the iteration in operation 408 comprises listing a dynamically sized page of first objects from an index, identifying respective metadata for respective objects of the first objects, and filtering out second objects of the first objects that do not match the search criterion, based on the respective metadata. That is, some subportion of objects in object storage 110 of FIG. 1 can be examined in each iteration.

After operation 408, process flow 400 moves to operation 410.

Operation 410 depicts, in response to determining that a threshold amount of time has elapsed relative to a timeout event associated with the first request, returning the first page of results, wherein the first page of results comprises the group of results, and a token that is usable to identify the first request in a second request for a second page of results that satisfy the search criterion.

That is, where a timeout event is close to being reached regarding responding to the first request (e.g., server 102 of FIG. 1 estimates that another iteration of results cannot be performed without reaching the timeout), then a partial page of results can be returned, where this partial page is not the last page of results. Along with the partial page, a token can be returned so that client computer 106 of FIG. 1 can use the token in making another request to server 102 for another page of results that responds to the request it is making. Each of these individual requests by client computer 106 as part of determining results of the query can be referred to as a separate request (e.g., a first request and a second request)

After operation 410, process flow 400 moves to 412, where process flow 400 ends.

FIG. 5 illustrates an example process flow 500 that can facilitate paginated listing with partial pages, in accordance with an embodiment of this disclosure. In some examples, one or more embodiments of process flow 500 can be implemented by paginated listing with partial pages component 108 of FIG. 1, or computing environment 1100 of FIG. 11.

It can be appreciated that the operating procedures of process flow 500 are example operating procedures, and that there can be embodiments that implement more or fewer operating procedures than are depicted, or that implement the depicted operating procedures in a different order than as depicted. In some examples, process flow 500 can be implemented in conjunction with one or more embodiments of one or more of process flow 200 of FIG. 2, process flow 300 of FIG. 3, process flow 400 of FIG. 4, process flow 600 of FIG. 6, process flow 700 of FIG. 7, process flow 800 of FIG. 8, process flow 900 of FIG. 9, and/or process flow 1000 of FIG. 10.

In some examples, process flow 500 can be implemented in conjunction with process flow 400 of FIG. 4, where the group of results is a first group of results, where the number of results is a first number of results, and where the iteration is a first iteration.

Process flow 500 begins with 502, and moves to operation 504.

Operation 504 depicts, in response to receiving the second request, performing a second iteration of identifying a second group of results of the elements that satisfy the search criterion, wherein the second group of results is different than the first group of results. That is, more results (relative to results in response to the first request of operation 404) can be found in response to the second request of operation 410.

After operation 504, process flow 500 moves to operation 506.

Operation 506 depicts, in response to determining that a second number of results in the second group of results is equal to the limit, returning the second page and the token, wherein the second page comprises the second group of results. That is, a page of results can be returned where the maximum page size is reached (in contrast to returning a partial page of results because a timeout event is approaching, as in operation 410).

In some examples, the timeout event is a first timeout event, and returning the second page is performed independently of a second timeout event that is associated with the second request. That is, it can be that the second page is returned because a maximum page size is reached, and not because a timeout event is approaching.

After operation 506, process flow 500 moves to 508, where process flow 500 ends.

FIG. 6 illustrates an example process flow 600 that can facilitate paginated listing with partial pages, in accordance with an embodiment of this disclosure. In some examples, one or more embodiments of process flow 600 can be implemented by paginated listing with partial pages component 108 of FIG. 1, or computing environment 1100 of FIG. 11.

It can be appreciated that the operating procedures of process flow 600 are example operating procedures, and that there can be embodiments that implement more or fewer operating procedures than are depicted, or that implement the depicted operating procedures in a different order than as depicted. In some examples, process flow 600 can be implemented in conjunction with one or more embodiments of one or more of process flow 200 of FIG. 2, process flow 300 of FIG. 3, process flow 400 of FIG. 4, process flow 500 of FIG. 5, process flow 700 of FIG. 7, process flow 800 of FIG. 8, process flow 900 of FIG. 9, and/or process flow 1000 of FIG. 10.

In some examples, process flow 600 can be implemented in conjunction with process flow 400 of FIG. 4 where the group of results are a first group of results, where the number of results is a first number of results, and where the iteration is a first iteration.

Process flow 600 begins with 602, and moves to operation 604.

Operation 604 depicts, in response to receiving the second request, performing a second iteration of identifying a second group of results of the elements that satisfy the search criterion, wherein the second group of results is different than the first group of results. In some examples, operation 604 can be implemented in a similar manner as operation 504 of FIG. 5.

After operation 604, process flow 600 moves to operation 606.

Operation 606 depicts, in response to determining that a second number of results in the second group of results is less than the limit and that there are no more results, returning the second page without returning the token, wherein the second page comprises the second group of results. That is, a page of results can be returned where all results responsive to the search criterion have been found (in contrast to returning a partial page of results because a timeout event is approaching, as in operation 410).

In some examples, the timeout event is a first timeout event, and returning the second page is performed independently of a second timeout event that is associated with the second request. That is, it can be that the second page is returned because all results have been found, and not because a timeout event is approaching.

After operation 606, process flow 600 moves to 608, where process flow 600 ends.

Figure 7:
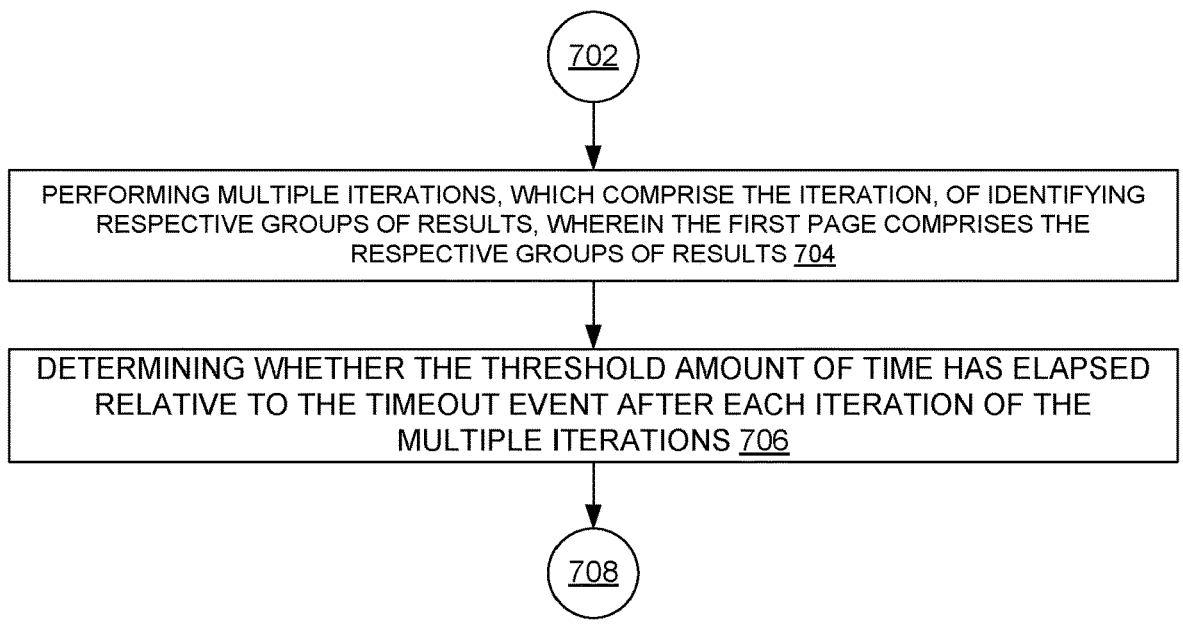
FIG. 7 illustrates another example process flow that can facilitate paginated listing with partial pages, in accordance with an embodiment of this disclosure.

FIG. 7 illustrates an example process flow 700 that can facilitate paginated listing with partial pages, in accordance with an embodiment of this disclosure. In some examples, one or more embodiments of process flow 700 can be implemented by paginated listing with partial pages component 108 of FIG. 1, or computing environment 1100 of FIG. 11.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 800 of FIG. 8, process flow 900 of FIG. 9, and/or process flow 1000 of FIG. 10.

In some examples where process flow 700 is performed in conjunction with process flow 400 of FIG. 4, the iteration is a first iteration.

Process flow 700 begins with 702, and moves to operation 704.

Operation 704 depicts performing multiple iterations, which comprise the iteration, of identifying respective groups of results, wherein the first page comprises the respective groups of results. That is, the iteration of operation 408 can be part of performing multiple iterations of finding results. For example, each iteration can comprise finding some results for a predefined amount of time.

After operation 704, process flow 700 moves to operation 706.

Operation 706 depicts determining whether the threshold amount of time has elapsed relative to the timeout event after each iteration of the multiple iterations. That is, whether a timeout event is approaching (e.g., whether a threshold amount of time has elapsed in operation 410 of FIG. 4) can be checked after performing each iteration in operation 704.

FIG. 8 illustrates an example process flow 800 that can facilitate paginated listing with partial pages, in accordance with an embodiment of this disclosure. In some examples, one or more embodiments of process flow 800 can be implemented by paginated listing with partial pages component 108 of FIG. 1, or computing environment 1100 of FIG. 11.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 900 of FIG. 9, and/or process flow 1000 of FIG. 10.

Process flow 800 begins with 802, and moves to operation 804.

Operation 804 depicts determining to respond to a first request to list elements in data storage that satisfy a search criterion with a paginated result, wherein the paginated result comprises an upper limit on number of results. In some examples, operation 804 can be performed in a similar manner as operations 404-406 of FIG. 4.

After operation 804, process flow 800 moves to operation 806.

Operation 806 depicts performing an iteration of identifying a group of results of the elements that satisfy the search criterion, wherein a number of results in the group of results is less than the upper limit on the number of results, and wherein the group of results does not comprise at least one additional result. In some examples, operation 806 can be performed in a similar manner as 408 of FIG. 4.

After operation 806, process flow 800 moves to operation 808.

Operation 808 depicts, in response to determining that a threshold amount of time has elapsed relative to a timeout event associated with the first request, returning the paginated result that comprises the group of results, and a token that is configured to be used to identify the first request in a second request for a second paginated result. In some examples, operation 808 can be performed in a similar manner as operation 410 of FIG. 4.

In some examples, the threshold amount of time is determined before request the first request. In some examples, the threshold amount of time is determined based on applying a machine learning technique. That is, implementing an analysis of whether the threshold amount of time is reached can comprise comparing the time remaining against a set threshold or a machine learning technique.

After operation 808, process flow 800 moves to 810, where process flow 800 ends.

Figure 9:
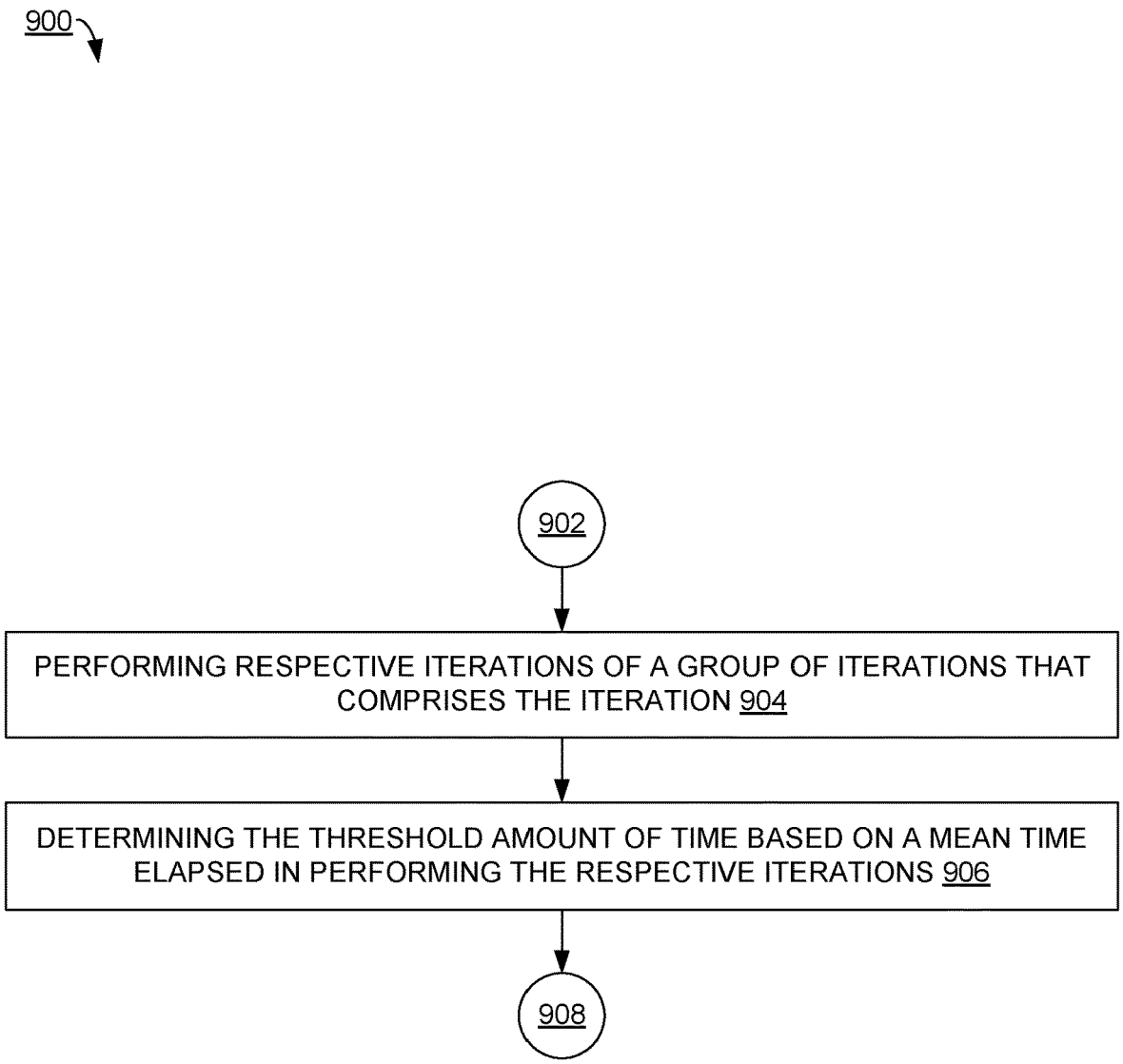
FIG. 9 illustrates another example process flow that can facilitate paginated listing with partial pages, in accordance with an embodiment of this disclosure.

FIG. 9 illustrates an example process flow 900 that can facilitate paginated listing with partial pages, in accordance with an embodiment of this disclosure. In some examples, one or more embodiments of process flow 900 can be implemented by paginated listing with partial pages component 108 of FIG. 1, or computing environment 1100 of FIG. 11.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, and/or process flow 1000 of FIG. 10.

Process flow 900 begins with 902, and moves to operation 904.

Operation 904 depicts performing respective iterations of a group of iterations that comprises the iteration. That is, multiple iterations of finding relevant results can be performed.

After operation 904, process flow 900 moves to operation 906.

Operation 906 depicts determining the threshold amount of time based on a mean time elapsed in performing the respective iterations. That is, in some examples, operation 906 can comprise tracking a mean time taken for each iteration, and abort returning a partial page if mean(iteration_duration)*c<time_remaining.

In some examples, the threshold amount of time is based on a multiple of the mean time. That is, using the expression above, in some examples, c can be 1.5 by default.

In some examples, a value of the multiple is determined based on a global system parameter. That is, the value of c can be set for all instances of providing partial paginated results performed by a system.

After operation 906, process flow 900 moves to operation 908, where process flow 900 ends.

FIG. 10 illustrates an example process flow 1000 that can facilitate paginated listing with partial pages, in accordance with an embodiment of this disclosure. In some examples, one or more embodiments of process flow 1000 can be implemented by paginated listing with partial pages component 108 of FIG. 1, or computing environment 1100 of FIG. 11.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 200 of FIG. 2, process flow 300 of FIG. 3, process flow 400 of FIG. 4, process flow 500 of FIG. 5, process flow 600 of FIG. 6, process flow 700 of FIG. 7, process flow 800 of FIG. 8, and/or process flow 900 of FIG. 9.

Process flow 1000 begins with 1002, and moves to operation 1004.

Operation 1004 depicts determining to respond to a first request to list elements that satisfy a search criterion with a paginated result. In some examples, operation 1004 can be performed in a similar manner as operations 404-406 of FIG. 4.

In some examples the paginated result is a partial paginated result, and determining to respond to the first request to list the elements of a storage system that satisfy the search criterion with the partial paginated result is performed based on identifying that a global system parameter of the system indicates using the partial paginated result. That is, there can be a global system parameter for a system that is configured to provide paginated results that indicates to provide paginated results.

In some examples, the paginated result is a partial paginated result, and determining to respond to the first request to list the elements in data storage that satisfy the search criterion with the partial paginated result is performed based on identifying that the first request comprises a flag that indicates using the partial paginated result. That is, there can be a flag in a request for results that indicates using paginated results, and paginated results can be returned for that request (and not for other requests where such a flag is not indicated).

In some examples, operation 1004 comprises responding to a third request with a non-partially paginated result based on determining that the third request lacks the flag that indicates using partial paginated results. That is, the third request can lack a flag that indicates using paginated results.

After operation 1004, process flow 1000 moves to operation 1006.

Operation 1006 depicts performing an iteration of identifying a group of results of the elements that satisfy the search criterion, wherein a number of results in the group of results is less than a maximum number of results, and wherein there is at least one additional result that is outside of the group of results. In some examples, operation 1006 can be performed in a similar manner as operation 408 of FIG. 4.

In some examples, a value of the maximum number of results is indicated by the first request. That is, a page size can be defined by a parameter in the request being serviced.

In some examples, operation 1006 comprises using a default value of the maximum number of results in response to determining that the first request omits indicating a value of the maximum number of results. That is, in some examples, a default page size can be used where it is otherwise not defined by a parameter in the request being serviced.

After operation 1006, process flow 1000 moves to operation 1008.

Operation 1008 depicts, in response to determining that a threshold amount of time has elapsed relative to a timeout event associated with the first request, returning the paginated result that comprises the group of results, and a token that is configured to identify the first request in a second request for a second paginated result. In some examples, operation 1008 can be performed in a similar manner as operation 410 of FIG. 4.

After operation 1008, process flow 1000 moves to 1010, where process flow 1000 ends.

Example Operating Environment

In order to provide additional context for various embodiments described herein, FIG. 11 and the following discussion are intended to provide a brief, general description of a suitable computing environment 1100 in which the various embodiments of the embodiment described herein can be implemented.

For example, parts of computing environment 1100 can be used to implement one or more embodiments of server 102 and/or client computer 106 of FIG. 1.

In some examples, computing environment 1100 can implement one or more embodiments of the process flows of FIGS. 2-10 to facilitate paginated listing with partial pages.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a nonvolatile storage such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are examples, and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory coupled to the at least one processor, comprising instructions that, in response to execution by the at least one processor, cause the system to perform operations, comprising:
      receiving a first request to list elements of a storage system that satisfy a search criterion;

determining to respond to the first request with a first page of results, wherein there is a limit to a number of results contained in the first page;

performing a set of at least one iteration of identifying a group of results of the elements that satisfy the search criterion, wherein a number of results in the group of results is less than the limit, wherein there is at least one result that is not included in the group of results, and wherein, after each iteration of the set of at least one iteration, a determination of whether to perform an additional iteration for the first page of results is made based on whether an amount of time associated with performing the additional iteration satisfies a timeout event criterion; and in response to determining that the amount of time associated with performing the additional iteration satisfies the timeout event criterion, returning the first page of results, wherein the first page of results comprises the group of results, and a token that is usable to identify the first request in a second request for a second page of results that satisfy the search criterion.

2. The system of claim 1, wherein the group of results is a first group of results, wherein the number of results is a first number of results, wherein the iteration is a first iteration, and wherein the operations further comprise:

in response to receiving the second request, performing a second iteration of identifying a second group of results of the elements that satisfy the search criterion, wherein the second group of results is different than the first group of results; and in response to determining that a second number of results in the second group of results is equal to the limit, returning the second page and the token, wherein the second page comprises the second group of results.

3. The system of claim 2, wherein the timeout event is a first timeout event, and wherein returning the second page is performed independently of a second timeout event that is associated with the second request.

4. The system of claim 1, wherein the group of results are a first group of results, wherein the number of results is a first number of results, wherein the iteration is a first iteration, and wherein the operations further comprise:

in response to receiving the second request, performing a second iteration of identifying a second group of results of the elements that satisfy the search criterion, wherein the second group of results is different than the first group of results; and in response to determining that a second number of results in the second group of results is less than the limit and that there are no more results, returning the second page without returning the token, wherein the second page comprises the second group of results.

5. The system of claim 4, wherein the timeout event is a first timeout event, and wherein returning the second page is performed independently of a second timeout event that is associated with the second request.

6. The system of claim 1, wherein the set of at least one iteration comprises at least two iterations.

7. The system of claim 1, wherein performing the iteration of identifying the group of results of the elements that satisfy the search criterion comprises:

listing a dynamically sized page of first objects from an index;

identifying respective metadata for respective objects of the first objects; and filtering out second objects of the first objects that do not match the search criterion, based on the respective metadata.

8. A method, comprising:

determining, by a system comprising at least one processor, to respond to a first request to list elements in data storage that satisfy a search criterion with a paginated result, wherein the paginated result comprises an upper limit on number of results;

performing, by the system, a set of at least one iteration of identifying a group of results of the elements that satisfy the search criterion, wherein a number of results in the group of results is less than the upper limit on the number of results, wherein the group of results does not comprise at least one additional result, and wherein, after each iteration of the set of at least one iteration, a determination of whether to perform an additional iteration for the first page of results is made based on whether an amount of time associated with performing the additional iteration satisfies a timeout event criterion; and in response to determining that the amount of time associated with performing the additional iteration satisfies the timeout event criterion, returning, by the system, the paginated result that comprises the group of results, and a token that is configured to be used to identify the first request in a second request for a second paginated result.

9. The method of claim 8, wherein the the timeout event criterion is determined before request the first request.

10. The method of claim 8, wherein the the timeout event criterion is determined based on applying a machine learning technique.

11. The method of claim 8, further comprising:

determining, by the system, the the timeout event criterion based on a mean time elapsed in performing respective iterations of a group of iterations that comprises the iteration.

12. The method of claim 11, wherein the the timeout event criterion is based on a multiple of the mean time.

13. The method of claim 12, wherein a value of the multiple is determined based on a global system parameter.

14. A non-transitory computer-readable medium comprising instructions that, in response to execution, cause a system comprising at least one processor to perform operations, comprising determining to respond to a first request to list elements that satisfy a search criterion with a paginated result;

performing at least one iteration of identifying a group of results of the elements that satisfy the search criterion, wherein a number of results in the group of results is less than a maximum number of results, wherein there is at least one additional result that is outside of the group of results, and wherein, after each iteration of the at least one iteration, a determination of whether to perform an additional iteration for the first page of results is made based on whether an amount of time associated with performing the additional iteration satisfies a timeout event criterion; and in response to determining that the amount of time associated with performing the additional iteration satisfies the timeout event criterion, returning the paginated result that comprises the group of results, and a token that is configured to identify the first request in a second request for a second paginated result.

15. The non-transitory computer-readable medium of claim 14, wherein the paginated result is a partial paginated result, and wherein determining to respond to the first request to list the elements of a storage system that satisfy the search criterion with the partial paginated result is performed based on identifying that a global system parameter of the system indicates using the partial paginated result.

16. The non-transitory computer-readable medium of claim 14, wherein the paginated result is a partial paginated result, and wherein determining to respond to the first request to list the elements in data storage that satisfy the search criterion with the partial paginated result is performed based on identifying that the first request comprises a flag that indicates using the partial paginated result.

17. The non-transitory computer-readable medium of claim 16, wherein the operations further comprise:
responding to a third request with a non-partially paginated result based on determining that the third request lacks the flag that indicates using partial paginated results.

18. The non-transitory computer-readable medium of claim 14, wherein a value of the maximum number of results is indicated by the first request.

19. The non-transitory computer-readable medium of claim 14, wherein the operations further comprise:
using a default value of the maximum number of results in response to determining that the first request omits indicating a value of the maximum number of results.

20. The non-transitory computer-readable medium of claim 14, wherein the group of results is a first group of results, wherein the number of results is a first number of results, wherein the iteration is a first iteration, and wherein the operations further comprise:
in response to receiving the second request, performing a second iteration of identifying a second group of results of the elements that satisfy the search criterion, wherein the second group of results is different than the first group of results; and
in response to determining that a second number of results in the second group of results is equal to the limit, returning the second page and the token, wherein the second page comprises the second group of results.

* * * * *